(12) United States Patent
Bryden et al.

(10) Patent No.: US 7,221,675 B2
(45) Date of Patent: May 22, 2007

(54) ADDRESS RESOLUTION METHOD FOR A VIRTUAL PRIVATE NETWORK, AND CUSTOMER EDGE DEVICE FOR IMPLEMENTING THE METHOD

(75) Inventors: Simon Bryden, La Roquette sur Siagne (FR); Michael Tate, Mouans Sartoux (FR); Geoffrey Mattson, Nashua, NH (US)

(73) Assignee: Nortel Networks Limited, St. Laurent, Quebec (CA)

( * ) Notice: Subject to any disclaimer, the term of this patent is extended or adjusted under 35 U.S.C. 154(b) by 967 days.

(21) Appl. No.: 10/054,208

(22) Filed: Jan. 22, 2002

(65) Prior Publication Data

US 2003/0108051 A1  Jun. 12, 2003

(30) Foreign Application Priority Data

Dec. 7, 2001  (EP)  .................................. 01403178

(51) Int. Cl.
 *H24L 12/28*  (2006.01)
 *H24L 12/56*  (2006.01)
(52) U.S. Cl. ...................................... 370/392; 370/401
(58) Field of Classification Search ................ 370/389, 370/392, 401, 409, 400, 471, 395.1–395.72, 370/469
See application file for complete search history.

(56) References Cited

U.S. PATENT DOCUMENTS 5,708,654 A * 1/1998 Arndt et al. ................. 370/242
6,587,467 B1 * 7/2003 Morgenstern et al. ...... 370/399
6,640,251 B1 * 10/2003 Wiget et al. ................. 709/238
6,717,944 B1 * 4/2004 Bryden et al. .............. 370/392
7,006,499 B2 * 2/2006 Tingle et al. ................ 370/392
7,136,374 B1 * 11/2006 Kompella .................... 370/352
2002/0034173 A1 * 3/2002 Border et al. ............... 370/338
2002/0037010 A1 * 3/2002 Yamauchi ............. 370/395.53
2002/0181477 A1 * 12/2002 Mo et al. ..................... 370/401
2003/0103507 A1 * 6/2003 Lynch et al. ................ 370/392
2004/0202171 A1 * 10/2004 Hama ....................... 370/395.1
2005/0025069 A1 * 2/2005 Aysan ......................... 370/254

(Continued)

OTHER PUBLICATIONS

G. Fairhurst, "Address Resolution Protocol (arp)", Jan. 1, 2001, www.erg.abdn.ac.uk/users/gorry/course/inet-pages/arp.html.*

(Continued)

*Primary Examiner*—Wing Chan
*Assistant Examiner*—Warner Wong
(74) *Attorney, Agent, or Firm*—Barnes & Thornburg, LLP

(57) ABSTRACT

A virtual private network (VPN) service is provided through a shared network infrastructure, with customer edge (CE) devices each having a provider edge (PE) interface having a single layer 3 address in the VPN. An address resolution request message is transmitted by a first CE device on plural layer 2 virtual circuits of its PE interface. The address resolution request message including the layer 3 address allocated to a second CE device of the VPN. In response to reception of such request message at the second CE device, an address resolution response message is returned to the first CE device. In response to reception of this response message, the first CE device maps the layer 3 address allocated to the second CE device to a virtual LAN identifier of the layer 2 virtual circuit on which the response message is received.

27 Claims, 1 Drawing Sheet

U.S. PATENT DOCUMENTS

2005/0190757 A1* 9/2005 Sajassi ................. 370/389
2006/0034292 A1* 2/2006 Wakayama et al. ...... 370/395.5

OTHER PUBLICATIONS

Request For Comments (RFC) 2764 published in Feb. 2000 by the IETF, "A Framework for IP Based Virtual Private Networks".

Request For Comments (RFC) 3031 published in Jan. 2001 by the IETF, "Multiprotocol Label Switching Architecture".

Internet Draft draft-kompella-ppvpn-l2vpn-01.txt, published in Nov. 2001 by the IETF, "Layer 2 VPNs Over Tunnels".

Internet Draft draft-martini-l2circuit-trans-mpls-08.txt, published in Nov. 2001 by the IETF, "Transport of Layer 2 Frames Over MPLS".

Request For Comments (RFC) 826 published in Nov. 1982 by the IETF, "An Ethernet Address Resolution Protocol".

* cited by examiner

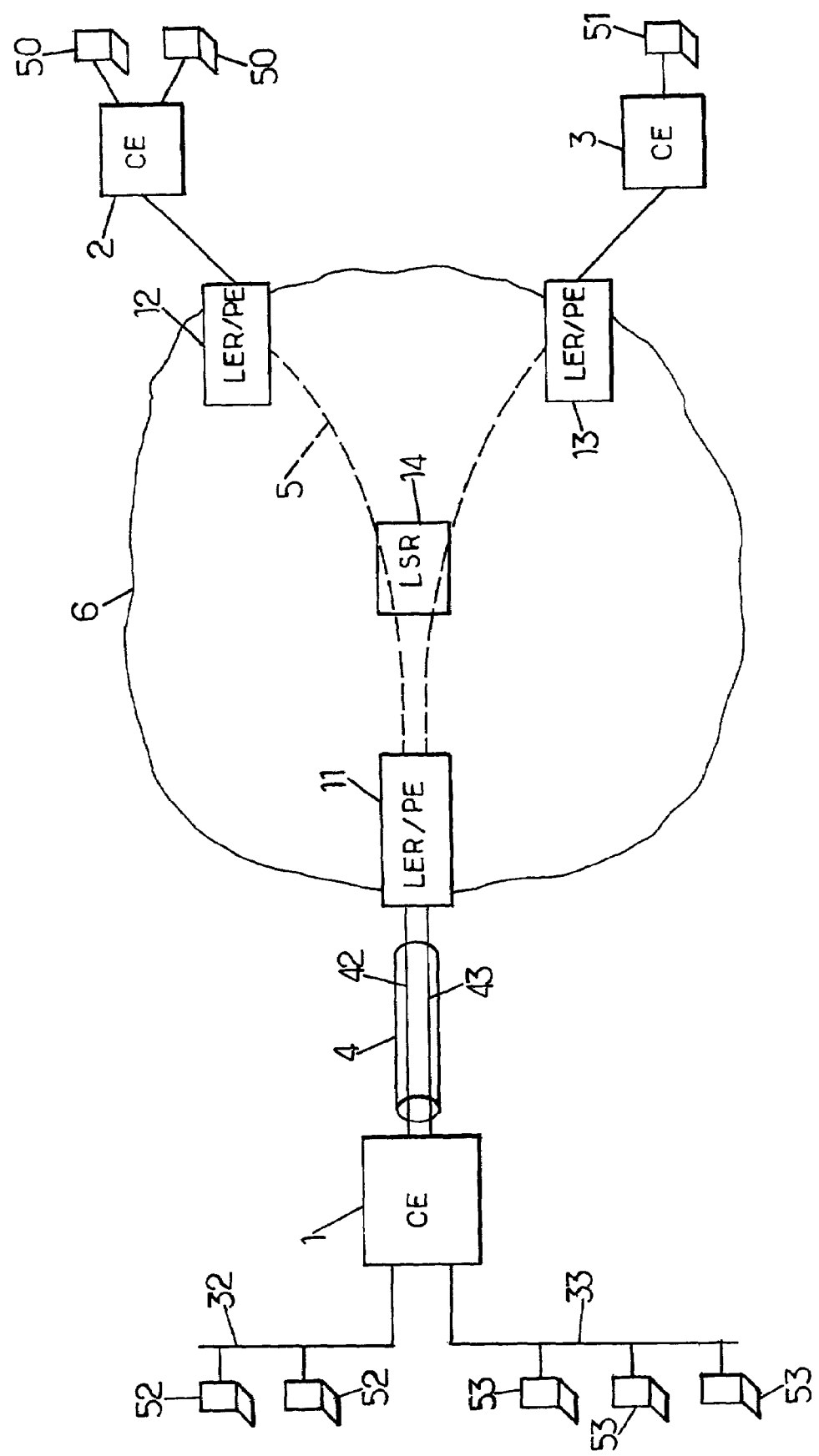

ADDRESS RESOLUTION METHOD FOR A VIRTUAL PRIVATE NETWORK, AND CUSTOMER EDGE DEVICE FOR IMPLEMENTING THE METHOD

BACKGROUND OF THE INVENTION

The present invention relates to the provision of virtual private network (VPN) services through carrier networks such as Metropolitan Area Networks (MANs) or Wide Area Networks (WANs), and more particularly to address resolution methods used in such VPN.

A VPN emulates a private network over public or shared infrastructures. When the shared infrastructure is an IP network such as the Internet, the VPN can be based on an IP tunneling mechanism, as described in Request For Comments (RFC) 2764 published in February 2000 by the Internet Engineering Task Force (IETF). Another approach provides link layer connectivity for the devices affiliated to the VPN.

Traditional WAN data layer 2 services provided by carriers are based on the virtual circuit concept. Data units are switched within the carrier network along pre-established trails referred to as virtual circuits. These data units are for instance packets in X.25 networks, frames in Frame Relay (FR) networks, cells in Asynchronous Transfer Mode (ATM) networks, . . . The carrier network may also have a Multi-Protocol Label Switching (MPLS) architecture built over an infrastructure supporting a connectionless network layer protocol such as IP. MPLS is described in RFC 3031 published in January 2001 by the IETF. The virtual circuits within a MPLS network are referred to as Label Switched Paths (LSPs).

The virtual circuits can be pre-established by a configuration process, called "provisioning", performed by the network operator: they are then called Permanent Virtual Circuits (PVC). Alternatively, they can established dynamically on request from the customer equipment: they are then called Switched Virtual Circuits (SVC).

Recently, several vendors have been promoting Ethernet as a universal access media for LAN, MAN and WAN services. Several drafts presented at the IETF cover the way to signal and provision L2 VPN services based on an IP/MPLS infrastructure (see, e.g., Kompella et al., "MPLS-based Layer 2 VPNs", Internet Draft, draft-kompella-ppvpn-l2vpn-00.txt, published in June 2001 by the IETF).

As specified in the IEEE standard 802.1Q approved in December 1998, Ethernet networks may support one or more Virtual Local Area Networks (VLANs). An Ethernet frame circulating in such a network may include, after the Medium Access Control (MAC) address, an additional field called tag header or Q-tag which contains a VLAN identifier (VID). Accordingly, a VLAN-aware Ethernet bridge has the ability to perform frame switching based on the VID, deduced either from the physical port from which the incoming frame is received or from the contents of its tag header. A VLAN is used for the layer 2 broadcasting and forwarding of frames within a sub-group of users (subscribers of that VLAN). For example, in a corporation, it is possible to define respective virtual LANs for various departments to enable selective broadcasting and forwarding of information in the layer 2 procedures.

It has been suggested that the concept of VLAN can be extended in the case where Ethernet traffic is transported over a MPLS network (see, e.g., Martini et al., "Transport of Layer 2 Frames Over MPLS", Internet Draft, draft-martini-l2circuit-trans-mpis-07.txt, published in July 2001 by the IETF).

In such a case, a specific MPLS virtual circuit, or LSP, originating at a PE can be associated with each VLAN to forward the frames intended for subscribers of that VLAN. The CE sends tagged frames to the PE and the latter switches them to the relevant virtual circuits based on the ingress physical port and the VID.

Such VLAN multiplexing on the PE/CE interface may be used to build a layer 3 architecture, e.g. an IP architecture, over a backbone based on data link layer VCs (Frame Relay, ATM, X.25, MPLS, etc.). In such a case, the VLAN identifier is used locally on the PE/CE interface to discriminate VCs established within the backbone. In other words, it is a layer 2 address used by a given CE device to communicate with another CE device connected to a remote PE: at the given CE, the VID corresponds to the sub-group of users accessible trough this other CE.

In the customer layer 3 architecture, the CE devices usually include routers. The operations that they perform on an incoming IP datagram comprise (i) analyzing the destination address in the IP header by means of a routing table to determine the "next hop", i.e. the IP address of the next router or host where the datagram should be forwarded, and (ii) retrieving the layer 2 address to be used for forwarding this datagram, based on the next hop IP address. Step (ii) requires a mapping between remote IP addresses and local layer 2 addresses.

In this application, the VID on the CE/PE interface can be compared with the data link connection identifier (DLCI) used as a layer 2 address in frame relay access services. When a VC is initialized in such frame relay VPN service, an inverse Address Resolution Protocol (inverse ARP) is used to discover the IP address configured at the other end of the VC. An address resolution table is thus built in the CE router in order to forward the user frames. In a typical hub-and-spoke topology, there will be only one entry in the address resolution table of each spoke for the hub address, and one entry per spoke at the hub for mapping the IP address to the corresponding DLCI.

However, unlike current WAN layer 2 technologies (Frame Relay, ATM . . . ), Ethernet circuits (including VLANs with a single Ethernet interface) are interpreted by layer 3 devices as being separate layer 3 subnets. This implies a separate layer 3 interface address for each VLAN. When applied to the VPN case, where the VLAN identifier is used to map incoming traffic to remote destinations over virtual circuits, this causes an increase in provisioning and resource usage, e.g. layer 3 address space.

It is therefore an object of the present invention to propose an address resolution method which is readily applicable to various customer layer 3 devices. Another object is to avoid unnecessary address space wastages, in particular by permitting the customer device to interpret a group of VLAN identifiers on a given PE/CE interface as a single layer 3 interface.

SUMMARY OF THE INVENTION

The invention proposes an address resolution method for a VPN comprising CE devices each having a PE interface, wherein one of the PE interfaces has a single layer 3 address in the VPN and supports a multiplex of layer 2 virtual circuits for communication with remote CE devices. The method comprises the steps of:

sending an address resolution request message, including a layer 3 address of a remote CE device, through said PE interface over each layer 2 virtual circuit of the multiplex;

in response to reception of an message responding to said request message at said PE interface on one of the layer 2 virtual circuits, mapping the layer 3 address of said remote CE device to said one of the layer 2 virtual circuits.

The invention also proposes an address resolution method for a VPN provided through a shared network infrastructure, the VPN comprising a plurality of CE devices each having a PE interface for connection to the shared network infrastructure. A respective layer 3 address is allocated to each CE device of the VPN. The CE devices of the VPN include a first CE device having a layer 3 router and a PE interface supporting a multiplex of layer 2 virtual circuits. Each of these layer 2 virtual circuits is distinguished by a respective virtual local area network identifier included in tagged data frames exchanged through said PE interface, and is provisioned in the shared network infrastructure for communication with a respective remote CE device of the VPN. The method comprising the following steps:

transmitting an address resolution request message from the first CE device on each of the layer 2 virtual circuits of the PE interface, the address resolution request message including the layer 3 address allocated to a second CE device of the VPN;

in response to reception of said request message at the second CE device, returning an address resolution response message to the first CE device; and in response to reception of the response message at the first CE device, memorizing a correspondence between the layer 3 address allocated to the second CE device and the virtual local area network identifier of the layer 2 virtual circuit on which the response message is received.

The methods are in particular applicable where the PE interface is an Ethernet interface. The address resolution request and response messages may then be messages of a standard Ethernet Address Resolution Protocol (ARP) as specified in RFC 826 published in November 1982 by the IETF.

ARP is normally present in all IP hosts, including the CE routers in the VPN context. Therefore, no protocol development is required to obtain the address mapping. It is sufficient that only the CE devices which have connections via multiple VIDs be adapted to generate ARP requests and broadcast them to the other CE devices of the VPN through the carrier network. The other CE devices will respond according to a standard ARP message if they find their IP address in the request. The reception of this response will provide the information needed at the first CE device.

ARP is preferably used because of its availability in most IP hosts. However, it is noted that there is no mapping of each VLAN-id onto a respective, specific IP address of the local router. The ARP message is sent from a single IP address to each of the VCs denoted by the VLAN-ids. The proposed method circumvents the need to provision multiple IP addresses at the PE interface of the first CE device, and hence multiple IP subnets each intended for only two hosts. The result is an important saving in address resources.

This advantage applies particularly in the case where the VPN has a hub-and-spoke topology, with the "first CE" at the hub site and multiple spoke CEs.

Another aspect of the invention relates to CE devices suitable for implementing the above methods in a VPN provided through a shared network infrastructure. This CE device may comprise:

a PE interface having a single layer 3 address in the VPN, for connection to the shared network infrastructure, said PE interface supporting a multiplex of layer 2 virtual circuits, wherein each of said layer 2 virtual circuits is distinguished by a respective virtual local area network identifier included in tagged data frames exchanged through said PE interface and is provisioned in the shared network infrastructure for communication with a respective remote CE device of the VPN;

a layer 3 router for routing packets based on layer 3 addresses contained therein;

means for transmitting an address resolution request message on each of the layer 2 virtual circuits of the PE interface, the address resolution request message including a layer 3 address allocated to one of the remote CE devices of the VPN; and means responsive to reception of an address resolution response message on the PE interface, for memorizing a correspondence between the layer 3 address allocated to said one of the remote CE devices and the virtual local area network identifier of the layer 2 virtual circuit on which the response message is received.

The preferred features of the above aspects which are indicated by the dependent claims may be combined as appropriate, and may be combined with any of the above aspects of the invention, as would be apparent to a person skilled in the art.

BRIEF DESCRIPTION OF THE DRAWING

The sole FIGURE is a schematic view of a network arrangement for carrying out the invention.

DESCRIPTION OF PREFERRED EMBODIMENTS

The invention is illustrated here in its currently preferred application to a VPN service of the Ethernet type using a MPLS-based carrier infrastructure. It will be appreciated that it can also be applied to other types of customer and/or provider networks.

The carrier network 6 shown in the FIGURE is for instance an IP network having routers supporting the MPLS architecture. Some of these routers 11, 12, 13 are label edge routers (LER) adapted to form PE (Provider Edge) devices for the provision of the L2 VPN service. Other routers of the carrier network 6, e.g. 14, are Label-Switched Routers (LSRs) which link the LERs by a full mesh of logical links (transport tunnels).

The FIGURE also shows CE (Customer Edge) devices 1, 2, 3. Each CE device is connected to one PE. These connections are made through an Ethernet interface carrying VID-based virtual circuits, in accordance with IEEE 802.1Q. Each CE device can be an access point to the carrier network for a set of stations 50–53 through a local Ethernet network.

These CE devices belong to a customer network. It is a virtual private network (VPN) insofar as some of its links are provided by means of the shared carrier network 6. It is noted that CE devices belonging to other customer networks (not shown) are normally connected to the carrier PEs.

As considered here, the CEs 1–3 of the customer VPN are arranged according to a hub-and-spoke topology. The CE device 1 is a hub in this example, and the CEs 2–3 are spokes, i.e. the hub (CE 1) has a plurality of point-to-point connections to the spokes (CEs 2–3), respectively, whereas each spoke only has one point-to-point connection to the hub.

Each of these point-to-point connections includes a virtual circuit provisioned by the carrier network operator. At each of the two PE devices to which the hub and a spoke are respectively connected, the provisioning of the virtual circuit between them includes the mapping of a MPLS LSP, used to transport the customer Ethernet frames between these two PE devices, onto a VLAN identifier (VID) configured on the PE/CE interface between this PE device and the CE device. The VIDs used at both ends of the virtual circuit may or may not be the same (it is even possible to provide VLAN multiplexing only at the hub PE interface 4). This provisioning of LSPs and VIDs is negotiated between the provider and the customer.

In the FIGURE, the VID multiplexing on the PE/CE interface is illustrated only between CE 1 and PE 11: the IEEE 802.1Q interface 4 support VIDs 42 and 43 in this simplified example. Every Ethernet frame circulating on the interface 4 includes a Q-tag containing VID=42 or VID=43. Based on this VID, the PE LER 11 switches the frame to the relevant LSP.

The customer VPN has a layer 3 architecture, typically based on IP (it is then an Intranet). Each CE device 1–3 has a single layer 3 IP address in the private network. The CE device 1 includes a router. It thus has a routing table which indicates what the next hop is for a given IP destination address, as well known in the art. It also has an address resolution table to associate respective layer 2 addresses to various IP addresses which may be output by the routing algorithm as a next hop IP address.

A problem addressed by the invention is how to obtain the entries of this address resolution table.

In a first step of the address resolution method proposed by the invention, the hub CE device 1 sends toward the PE device 11, multicast on every virtual circuit 42, 43 multiplexed on the interface 4, an Ethernet Address Resolution Protocol (ARP) request message as specified in the above-mentioned RFC 826. This request message includes the IP address of a spoke, say CE 2.

This first step may be triggered when a next hop IP address occurs for the first time as a result of the routing algorithm executed in the hub router, i.e. when the routing algorithm indicates a next hop for which there is no entry in the address resolution table. If the next hop address corresponds to a spoke, then a response will be obtained and the entry of the address resolution table will be created.

The ARP request message is transmitted by the PE 11 over the carrier network 6. It is forwarded on the different LSPs mapped to the VIDs 42, 43 indicated by the CE in the Q-tags of the frames carrying the message.

In the figure, the reference numeral 5 denotes one of the LSPs followed by the ARP message inside the carrier network 6. At the end of such LSP, the message is forwarded to the spoke CE 2 along the last leg of the virtual circuit.

Each CE device 2, 3 which so receives the message, analyzes the value of the IP address included in the ARP request and compares it to its own IP address. If these addresses match, the CE device 2 which is the recipient of the request returns an ARP response message, according to the above-mentioned RFC 826.

This response message contains the IP address of the CE device 2 and its local layer 2 address. It is sent back to the hub CE device 1, along the corresponding virtual circuit, and received in a tagged frame at the Ethernet interface 4. The CE device 1 reads the VID present in the Q-tag of the frame carrying the ARP response message including the spoke IP address and is thus able to create the entry in the address resolution table which associates this spoke IP address with the VID which is the local designation of the virtual circuit resource.

If the use of ARP is particularly well suited to the proposed address resolution method, as explained in previously, any other message transmitted by the CE device 1 along each of the virtual circuits 42, 43 supported by its PE interface 4, and requesting a response from the recipient CE device 2, would also be suitable.

Once the correspondence has been established by the CE device 1, the latter can directly tag the frames intended for the CE device 2, with a Q-tag containing the right VID referring to the virtual circuit 42, according to its address resolution table.

The text of the abstract repeated below is hereby deemed incorporated in the description:

A virtual private network (VPN) service is provided through a shared network infrastructure, with customer edge (CE) devices each having a provider edge (PE) interface having a single layer 3 address in the VPN. An address resolution request message is transmitted by a first CE device on plural layer 2 virtual circuits of its PE interface. The address resolution request message including the layer 3 address allocated to a second CE device of the VPN. In response to reception of such request message at the second CE device, an address resolution response message is returned to the first CE device. In response to reception of this response message, the first CE device maps the layer 3 address allocated to the second CE device to a virtual LAN identifier of the layer 2 virtual circuit on which the response message is received.

We claim:

1. An address resolution method for a virtual private network (VPN) comprising customer edge (CE) devices each having a provider edge (PE) interface, wherein one of the PE interfaces has a single layer 3 address in the VPN and supports a multiplex of layer 2 virtual circuits for communication with remote CE devices, the method comprising the steps of:

sending an address resolution request message, including a layer 3 address of a remote CE device, through said PE interface over each layer 2 virtual circuit of the multiplex;

in response to reception of a message responding to said request message at said PE interface on one of the layer 2 virtual circuits, mapping the layer 3 address of said remote CE device to said one of the layer 2 virtual circuits.

2. A method as claimed in claim 1, wherein the VPN is provided through a shared network infrastructure to which the CE devices are connected by their respective PE interfaces.

3. A method as claimed in claim 2, wherein each layer 2 virtual circuit of said multiplex is provisioned in the shared network infrastructure for communication with a respective remote CE device of the VPN.

4. A method as claimed in claim 1, wherein said one of the PE interfaces having a single layer 3 address in the VPN and supporting a multiplex of layer 2 virtual circuits for communication with remote CE devices belongs to a CE device including a layer 3 router of the VPN.

5. A method as claimed in claim 1, wherein the layer 2 virtual circuits of said multiplex are distinguished by respective virtual local area network identifiers included in tagged data frames exchanged through said one of the PE interfaces.

6. A method as claimed in claim 5, wherein the step of mapping the layer 3 address of said remote CE device to one of the layer 2 virtual circuits comprises memorizing a correspondence between said layer 3 address and the virtual local area network identifier of said one of the layer 2 virtual circuits.

7. A method as claimed in claim 1, wherein the response message includes the layer 3 address of said remote CE device.

8. A method as claimed in claim 1, wherein said one of the PE interfaces is an Ethernet interface.

9. A method as claimed in claim 8, wherein the address resolution request and response messages are messages of a standard Ethernet Address Resolution Protocol (ARP).

10. A method as claimed in claim 1, wherein the VPN has a hub-and-spoke topology, with said one of the PE interfaces at a hub site and said remote CE devices at spoke sites.

11. A customer edge (CE) device for a virtual private network (VPN), comprising:
   a provider edge (PE) interface having a single layer 3 address in the VPN and supporting a multiplex of layer 2 virtual circuits;
   means for transmitting, on each of the layer 2 virtual circuits of the PE interface, an address resolution request message including a layer 3 address of a remote CE device of the VPN; and
   means responsive to reception of an address resolution response message on one of the layer 2 virtual circuits, for mapping the layer 3 address of said remote CE device to said one of the layer 2 virtual circuits.

12. A device as claimed in claim 11, wherein said PE interface is for connection to a shared network infrastructure in which each layer 2 virtual circuit of said multiplex is provisioned for communication with a respective remote CE device of the VPN.

13. A device as claimed in claim 11, further comprising a layer 3 router of the VPN.

14. A device as claimed in claim 11, wherein the layer 2 virtual circuits of said multiplex are distinguished by respective virtual local area network identifiers included in tagged data frames exchanged through said PE Interface.

15. A device as claimed in claim 14, wherein the means for mapping the layer 3 address of a remote CE device to one of the layer 2 virtual circuits comprises means for storing a correspondence between said layer 3 address and the virtual local area network identifier of said one of the layer 2 virtual circuits.

16. A device as claimed in claim 11, wherein the response message includes the layer 3 address of said remote CE device.

17. A device as claimed in claim 11, wherein said PE interface is an Ethernet interface.

18. A device as claimed in claim 17, wherein the address resolution request and response messages are messages of a standard Ethernet Address Resolution Protocol (ARP).

19. A device as claimed in claim 11, disposed at a hub site of the VPN having a hub-and-spoke topology.

20. An address resolution method for a virtual private network (VPN) provided through a shared network infrastructure, the VPN comprising a plurality of customer edge (CE) devices each having a provider edge (PE) interface for connection to the shared network infrastructure, wherein a respective layer 3 address is allocated to each CE device of the VPN, wherein the CE devices of the VPN include a first CE device having a layer 3 router and a PE interface supporting a multiplex of layer 2 virtual circuits, wherein each of said layer 2 virtual circuits is distinguished by a respective virtual local area network identifier included in tagged data frames exchanged through said PE interface and is provisioned in the shared network infrastructure for communication with a respective remote CE device of the VPN, the method comprising the following steps:
   transmitting an address resolution request message from the first CE device on each of the layer 2 virtual circuits of the PE interface, the address resolution request message including the layer 3 address allocated to a second CE device of the VPN;
   in response to reception of said request message at the second CE device, returning an address resolution response message to the first CE device; and
   in response to reception of the response message at the first CE device, memorizing a correspondence between the layer 3 address allocated to the second CE device and the virtual local area network identifier of the layer 2 virtual circuit on which the response message is received.

21. A method as claimed in claim 20, wherein the address resolution response message includes the layer 3 address allocated to the second CE device, to be memorized in correspondence with the virtual local area network identifier of the layer 2 virtual circuit on which the response message is received at the first CE device.

22. A method as claimed in claim 20, wherein the PE Interface is an Ethernet interface.

23. A method as claimed in claim 22, wherein the address resolution request and response messages are messages of a standard Ethernet Address Resolution Protocol (ARP).

24. A method as claimed in claim 20, wherein the VPN has a hub-and-spoke topology, said first CE device being the hub and the other CE devices being spokes.

25. A customer edge (CE) device for a virtual private network (VPN) provided through a shared network infrastructure, comprising:
   a provider edge (PE) interface having a single layer 3 address in the VPN, for connection to the shared network infrastructure, said PE interface supporting a multiplex of layer 2 virtual circuits, wherein each of said layer 2 virtual circuits is distinguished by a respective virtual local area network identifier included in tagged data frames exchanged through said PE interface and is provisioned in the shared network infrastructure for communication with a respective remote CE device of the VPN;
   a layer 3 router for routing packets based on layer 3 addresses contained therein;
   means for transmitting an address resolution request message on each of the layer 2 virtual circuits of the PE interface, the address resolution request message including a layer 3 address allocated to one of the remote CE devices of the VPN; and
   means responsive to reception of an address resolution response message on the PE interface, for memorizing a correspondence between the layer 3 address allocated to said one of the remote CE devices and the virtual local area network identifier of the layer 2 virtual circuit on which the response message is received.

26. A device as claimed in claim 25, wherein the PE interface is an Ethernet interface.

27. A device as claimed in claim 26, wherein the address resolution request and response messages are messages of a standard Ethernet Address Resolution Protocol (ARP).

* * * * *